Feb. 13, 1962     H. C. LAMAR     3,020,667
FISHING LURE
Filed March 4, 1960
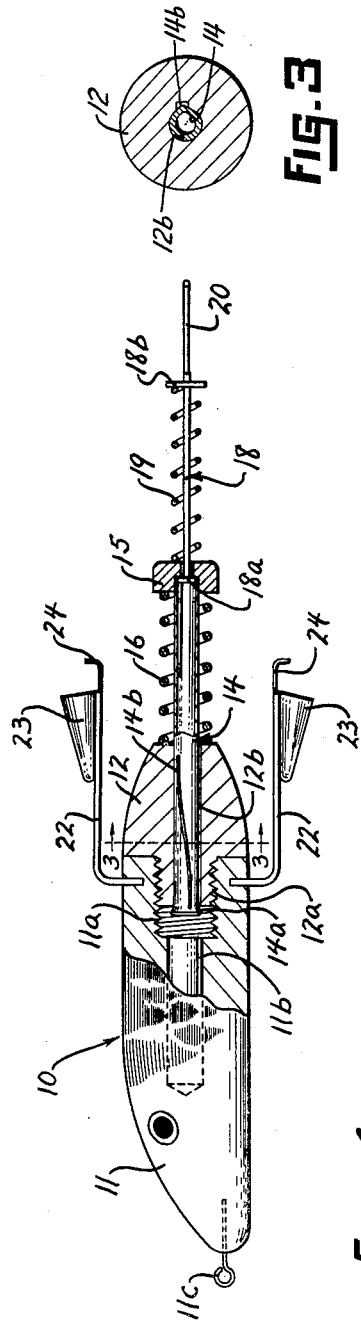
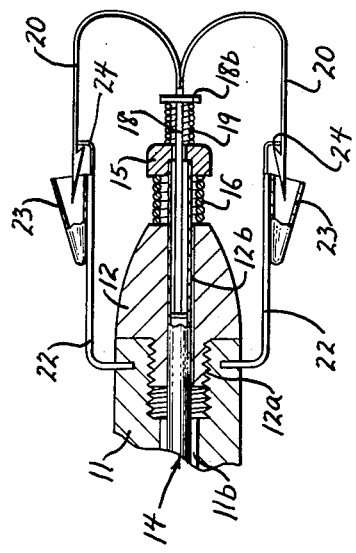
INVENTOR
HEBER C. LAMAR
BY
Lockwood Woodard Smith & Weikart
Attorneys United States Patent Office 3,020,667
Patented Feb. 13, 1962

3,020,667
FISHING LURE
Heber C. Lamar, P.O. Box 6411, Lawrence, Ind.
Filed Mar. 4, 1960, Ser. No. 12,744
11 Claims. (Cl. 43—35)

The present invention relates to a fishing lure, and more particularly to a new and improved weedless type fishing lure which is highly effective in use and, at the same time, is readily assembled.

As is known, fishermen have heretofore encountered difficulty in casting due to the oftentimes frequent entanglement of their lure or bait in weeds or like vegetation. The latter sometimes results in the snarling of the line or even the loss of the lure due to a bulky or a large mass of weeds.

By virtue of the instant invention, the applicant has provided a weedless fishing lure employing a novel arrangement of components whereby portions of the hooks are, during casting, partially enveloped within tube-like members due to a latching action and which, when struck by a fish, become disengaged and ready for hooking the fish. Spring members are employed to urge the movable portion of the fishing lure to a catching position, with the disengaging operation also including a rotational effect, preferably in the form of a quarter revolution, for even more effective action.

Accordingly, the principal object of the present invention is to provide a fishing lure having a new and novel arrangement of components which serve to make the lure incapable of being caught by weeds or like vegetation.

Another object of the present invention is to provide a new and novel weedless fishing lure wherein the hooks forming a part thereof are partially enveloped during the casting operation.

A still further object of the present invention is to provide a new and novel weedless fishing lure which, upon being struck by a fish, is readily movable from its normal casting position to a hooking position.

A further and more general object of the invention is to provide a new and novel weedless fishing lure made from a minimum of components which are readily assembled and which provide effective and positive hooking action upon use.

Other objects of the invention will become more apparent from the following description, taken in conjunction with the accompanying drawing, wherein, FIG. 1 is a view in side elevation, partially broken away, showing the components forming the instant invention; and, FIG. 2 is a fragmentary view showing the instant invention in casting condition.

FIG. 3 is a transverse sectional view taken along the line 3—3 of FIG. 1 in the direction of the arrows.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's novel weedless fishing lure includes a body 10 formed of a front member 11 and a rear member 12. The front member 11, which is typically longer than the rear member 12, has a threaded opening 11a longitudinally disposed therein, with the threaded opening 11a terminating in a smaller diameter unthreaded portion 11b. The rear member 12 is adapted to engage the front member 11 and a threaded portion 12a thereon is complementary to the threaded opening 11a of the front member 11. Rear member 12 has a longitudinally extending opening 12b therein generally aligned with the portion 11b disposed in the front member 11.

A hollow rod-like member 14 is slidably positioned in the longitudinal opening 12b in the rear member 12 and has an enlarged end element 15 secured thereto. A spring 16 is seated between the rear member 12 and the end element 15 and normally urges the rod-like member 14 into the position shown in FIG. 1 of the drawing. A flared end 14a formed on the rod-like member 14 serves to limit the outward movement thereof by bearing against a circumferential portion at an end of the longitudinal opening 12b in the rear member 12. The rod-like member 14 also includes a raised cam 14b which is complementary in shape to a groove in the longitudinal opening 12b in the rear member 12, for reasons to be discussed herebelow in detail.

An intermediate member 18 having a disc-like section 18a secured to one end thereof is adapted to extend through the end element 15 on the rod-like member 14, where the disc-like section 18a is freely slidable within the hollow rod-like member 14. The intermediate member 18 also has a disc-like member 18b disposed proximate the other end thereof, with a spring 19 being disposed between the disc-like member 18b and the end element 15 so that the intermediate member 18 is normally urged into a position approximating that disclosed by FIG. 1. Hook elements 20 are secured to the end of the intermediate member 18 (see FIG. 2).

Extending outwardly and rearwardly from the front member 11 are spring wire elements 22, each of which have a generally conical shaped tube 23 disposed at the free end thereof. A barbed catch 24 is suitably secured to each of the spring wire elements 22 and so arranged as to be received behind the end portion of each of the hook elements 20 (see FIG. 2), to be discussed more fully herebelow.

In operation, FIG. 1 discloses the applicant's novel invention in a disengaged condition, whereas FIG. 2 discloses the invention in condition for casting and prior to the time of striking by a fish. As should be particularly apparent from FIG. 2, when it is desired to use the fishing lure, the intermediate member 18 to which the hook elements 20 are secured is urged against the force of spring 19 towards the end element 15 disposed on the rod-like member 14. Such force, in turn, moves the end section 15, and, hence, the rod-like member 14, in a direction towards the rear member 12, the latter movement being, of course, against the normal force exerted by spring 16. The sharp end portions of the hook elements 20 then retain the overall assembly in operation condition by engaging the barbed catches 23 disposed on the spring wire elements 22. When the aforesaid engagement or latching is effected, the pointed ends of the hook elements 20 are partially disposed within the conical tubes 23 disposed on the spring elements 22 and, hence, afford a "weedless" fishing lure, i.e. one incapable of being caught in weeds or like vegetation.

The lure is tied to a fishing line (not shown) through an eye 11c disposed on the front of the front member 11, and conventionally used for casting or trolling. When the lure is struck by a fish, the spring wire elements 22 are depressed in a direction towards the rod-like member 14 and, as a result, the barbed catches 24 are released from their engaging relationship with the pointed portions of the hook elements 20, the latter thereafter rapidly moving towards the position disclosed by FIG. 1. Such latter rapid action is, of course, positively effected through the action of springs 16 and 19. It should be understood that as the hook elements 20 move away from the body of the fishing lure, they are rotated, preferably a quarter revolution, by virtue of the cam 14b and groove relationship discussed hereabove.

From the preceding, it should be apparent that the applicant has provided a new and novel weedless type fishing lure having an arrangement of components which not only prevent entanglement of the hook elements thereof during trolling or casting, but which, upon striking by a fish, is readily released to a hooking position, with the latter action further including a quarter rotation of the individual hook elements. The instant fishing lure provides a positive hooking action through a novel arrangement of components which are readily manufactured and assembled.

The applicant's novel fishing lure is, of course, susceptible to modification within the spirit of the invention. For example, more than the two illustrated hooking elements may be employed and, of course, the latter may be rotated through alternate ranges with equally effective results. In addition, the spring wire elements are adaptable to be positioned on the rear member of the body of the lure, instead of the front member, as shown. Thus, the above description should be considered illustrative, and not as limiting the scope of the following claims.

I claim:

1. A fishing lure comprising a body formed by a front member, a rear member engaging said front member, said members being provided with longitudinal openings extending through said rear member and into said front member adapted to slidably receive a tubular member, a tubular member slidably received in said openings, said slidable tubular member having a bearing element disposed at one end thereof, a spring surrounding said slidable tubular member and extending between said bearing element thereon and a portion of said rear member, an intermediate member extending through said bearing element and disposed in said slidable tubular member and having a portion at one end thereof freely slidable within said slidable tubular member, a hooking element secured to the other end of said intermediate member, a bearing element disposed thereon, a spring surrounding said intermediate member and extending between said bearing element disposed on said intermediate member and said bearing element disposed on said slidable tubular member, and a hollow member supported on said body adapted to selectively receive and partially envelop said hooking element.

2. A fishing lure comprising a body formed by a front member, a rear member engaging said front member, said members being provided with longitudinal openings extending through said rear member and into said front member adapted to slidably receive a tubular member, a tubular member slidably received in said openings, said slidable tubular member having a bearing element disposed at one end thereof, means engaging said bearing element and said rear member normally urging said slidable tubular member to extend outwardly from said rear member, an intermediate member extending through said bearing element on said tubular member and having a portion disposed at one end thereof freely slidable within said slidable tubular member, a hooking element secured to the other end of said intermediate member, a bearing element disposed thereon, means engaging said bearing element on said intermediate member and said bearing element on said slidable tubular member normally urging said intermediate member to extend outwardly from said slidable tubular member, and a hollow member supported on said body adapted to receive and partially envelop said hooking element in a nonextended position.

3. The structure of claim 2 where said slidable tubular member has a cammed outer surface complementary to the surface of said longitudinal opening extending through said rear member.

4. A fishing lure comprising a body formed by a front member, a rear member engaging said front member, said members being provided with longitudinal openings extending through said rear member and into said front member adapted to slidably receive a tubular member, a tubular member slidably received in said openings, said slidable tubular member having a bearing element disposed at one end thereof, a spring surrounding said tubular member and extending between said bearing element disposed thereon and a portion of said rear member, an intermediate member extending through said bearing element and disposed in said slidable tubular member and having a portion at one end thereof freely slidable within said slidable tubular member, a hooking element secured to the other end of said intermediate member, a bearing element disposed thereon, a spring surrounding said intermediate member and extending between said bearing element disposed thereon and said bearing element disposed on said slidable tubular member, latching means supported on said body of said lure and adapted to selectively engage a portion of said hooking element, and a hollow member adapted to receive and partially envelop said hooking element during latching.

5. The structure of claim 4 where said latching means is resiliently supported on said body of said lure.

6. The structure of claim 4 where said slidable tubular member has a cammed outer surface complementary to the surface of said longitudinal opening extending through said rear member.

7. A fishing lure comprising a body formed by a front member, a rear member engaging said front member, said members being provided with longitudinal openings extending through said rear member and into said front member adapted to slidably receive a tubular member, a tubular member slidably received in said openings, said slidable tubular member having a bearing element disposed at one end thereof, a spring surrounding said tubular member and extending between said bearing element disposed thereon and a portion of said rear member, an intermediate member extending through said bearing element and disposed in said slidable tubular member and having a portion at one end thereof freely slidable within said slidable tubular member, a hooking element secured to the other end of said intermediate member, a bearing element disposed thereon, a spring surrounding said intermediate member and extending between said bearing element disposed thereon and said bearing element disposed on said slidable tubular member, and latching means supported on said body of said lure and adapted to selectively engage a portion of said hooking element.

8. A fishing lure comprising a body, said body being provided with a longitudinal opening extending into said body adapted to slidably receive a tubular member, a tubular member slidably received in said opening, said slidable tubular member having a bearing element disposed at one end thereof, a spring surrounding said tubular member and extending between said bearing element disposed thereon and a portion of said body, an intermediate member extending through said bearing element and disposed in said slidable tubular member and having a portion at one end thereof freely slidable within said slidable tubular member, a hooking element secured to the other end of said intermediate member, a bearing element disposed thereon, a spring surrounding said intermediate member and extending between said bearing element disposed thereon and said bearing element disposed on said slidable tubular member, latching means suppported on said body of said lure and adapted to selectively engage a portion of said hooking element, and a hollow member adapted to receive and partially envelop said hooking element during latching.

9. A fishing lure comprising an elongated body having a longitudinally extending aperture therein opening rearwardly thereof, an elongated element slidably received in said longitudinal aperture and having one end extending from the opening thereof, a hooking element carried by said elongated element at said one end thereof, resilient means received between said body and elements and urging said elements rearwardly of said body to an extended position, and resilient members secured to said body and extending rearwardly and outwardly thereof, said resilient members having an outwardly projecting portion at their distal end engaging the rearward portion of said barbs of said hooking element and blocking said hooking element against projection to the rearward extended position.

10. The fishing lure of claim 9 in which said resilient members are arranged to resiliently urge outwardly said hooking element to retain the barbs of said hooking element when said hooking element is in retracted position, said resilient members being resiliently depressable inwardly toward said body to permit said elements to move to extended position.

11. The fishing lure of claim 10 in which said elongated element has cammed means thereon rotatably displacing said hooking element about an axis longitudinal of said body during movement of said hooking element between said retracted position and said extended position.

References Cited in the file of this patent

UNITED STATES PATENTS

| | | |
|---|---|---|
| 1,017,088 | Dremel | Feb. 13, 1912 |
| 1,869,111 | McLaughlin | July 26, 1932 |
| 2,485,946 | Watt | Oct. 25, 1949 |
| 2,544,782 | Fawcett | Mar. 13, 1951 |
| 2,722,764 | Juhrend | Nov. 8, 1955 |

FOREIGN PATENTS

| | | |
|---|---|---|
| 1,008,488 | France | Feb. 20, 1952 |